3,227,684
PROCESS FOR PREPARING HIGH-MOLECULAR WEIGHT THERMOPLASTIC POLYTHIOCARBONATES
André Jan Conix and Urbain Leopold Laridon, Wilrijk-Antwerp, Belgium, assignors to Gevaert Photo-Producten N.V., Mortsel, Belgium, a company of Belgium
No Drawing. Filed Nov. 20, 1961, Ser. No. 153,728
Claims priority, application Belgium, Nov. 18, 1960, 40,210
3 Claims. (Cl. 260—47)

It is known to prepare high molecular weight thermoplastic polycarbonates by reacting bisphenols with phosgene.

Reactions with phosgene are not only dangerous because of the extreme poisonousness of phosgene, but they are also difficult to regulate since phosgene is a gas with a boiling point of 8.3° C. under normal circumstances. In the above mentioned polycondensations phosgene has also to be applied in amounts larger than the stoichiometric amount in respect of the bisphenols.

It has now been found that high molecular weight linear thermoplastic polyesters of the class of the polythiocarbonates which has very interesting properties, can be obtained by reacting bisphenols with thiophosgene. One inherent advantage in the preparation of polythiocarbonates is that of using a liquid viz. thiophosgene as a starting material so that the difficulties of working with a gas are left out. In addition, an excess of thiophosgene in the reaction is not needed as is the case with phosgene. It suffices to work with a stoichiometric amount of thiophosgene in respect of the used bisphenol.

According to the invention, high molecular weight linear thermoplastic polyesters of the class of the polythiocarbonates can be prepared by condensation of thiophosgene dissolved in an organic solvent which is also a solvent for the polymer to be prepared and which is immiscible with water, with one or more alkali bisphenates dissolved in water.

Also according to the invention, the polycondensation of alkali bisphenates with thiophosgene is carried out in the presence of a catalytic amount of one or more onium compounds such as quaternary ammonium compounds, tertiary sulfonium compounds, quaternary phosphonium compounds and quaternary arsenium compounds. These catalysts are preferably applied in amounts varying between 0.01 and 5% based on the weight of the bisphenate or bisphenates. The most effective catalysts are soluble in the aqueous phase as well as in the organic phase and they can be added to the reaction mixture before, during or after mixing the two phases.

The polycondensation can be carried out at temperatures between —10° C. and the boiling point of the solvent used.

As a solvent for the alkali bisphenates water is used and as a common solvent for thiophosgene and for the polymer to be prepared are used halogenated hydrocarbons such as methylene chloride, 1,2-dichloroethane, 1,1,2-trichloroethane, sym.-tetrachloroethane and trichloroethylene. Other solvents which are immiscible with water such as benzene, toluene etc. can be applied together with the above mentioned solvents.

In the polycondensation reaction according to the invention the alkali bisphenate is obtained by dissolving the corresponding bisphenol in water in the presence of an equivalent amount of an alkali hydroxide such as sodium hydroxide or potassium hydroxide. The bisphenols correspond to compounds of the general formula:

HO—A—OH wherein A is a divalent radical selected from the group consisting of -cycloalkylidene-, -arylene-, -arylene-arylene-, -arylene-O-arylene-,

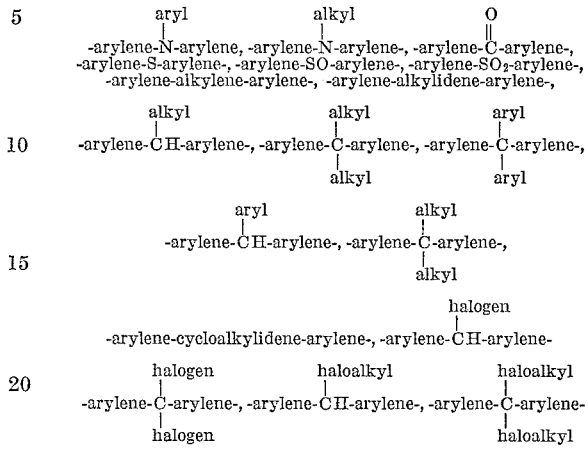

in which all of the arylene groups may contain halogen, alkyl or haloalkyl.

The following compounds are examples of bisphenols the alkali bisphenates of which are used for the preparation of polymers according to the invention:

Bis(4-hydroxyphenyl)-methane
Bis(4-hydroxy-3-methylphenyl)-methane
Bis(4-hydroxy-3,5-dichlorophenyl)-methane
Bis(4-hydroxy-3,5-dibromophenyl)-methane
Bis(4-hydroxy-3,5-difluorophenyl)-methane
Bis(4-hydroxyphenyl)-ketone
Bis(4-hydroxyphenyl)-sulfide
Bis(4-hydroxyphenyl)-sulfone
Bis(4-hydroxyphenyl)-ether
1,1-bis(4-hydroxyphenyl)-ethane
2,2-bis(4-hydroxyphenyl)-propane
2,2-bis(4-hydroxyphenyl)-butane
2,2-bis(4-hydroxyphenyl)-(4-methyl)-pentane
2,2-bis(4-hydroxy-3-methylphenyl)-propane
2,2-bis(4-hydroxy-3,5-dichlorophenyl)-propane
2,2-bis(4-hydroxy-3,5-dibromophenyl)-propane
Bis(4-hydroxyphenyl)-phenylmethane
Bis(4-hydroxyphenyl)-phenylmethyl methane
Bis(4-hydroxyphenyl)-diphenyl methane
Bis(4-hydroxyphenyl)-(4-methylphenyl)-methane
Bis(4-hydroxyphenyl)-(4-chlorophenyl)-methane
1,1-bis(4-hydroxyphenyl)-2,2,2-trichloroethane
1,1-bis(4-hydroxyphenyl)-cyclohexane
1,1-bis(4-hydroxyphenyl)-(3-methylphenyl)-propane
Bis(4-hydroxyphenyl)-cyclohexyl methane
2,2-bis(4-hydroxy-3-chlorophenyl)-propane The high molecular weight linear thermoplastic polythiocarbonates according to the invention contain structural units of the following formula:

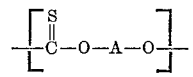

wherein A has the same significance as set out above.

According to the process of the invention, the polycondensation of thiophosgene with alkali bisphenate or alkali bisphenates is carried out in the presence of a catalytic amount of one or more onium compounds such as a quaternary ammonium compound, a tertiary sulfonium compound, a quaternary phosphonium compound and a quaternary arsonium compound.

Quaternary ammonium compounds according to the present invention which appeared to give particularly good results, are:

Trimethylbenzyl ammonium chloride
Triethylbenzyl ammonium hydroxide
Triethylbenzyl ammonium chloride Examples of suitable tertiary sulfonium compounds are for instance:

S,S'-p-xylylene-bis(dihydroxyethyl sulfonium bromide)
S,S'-1,6-hexamethylene-bis(dimethyl sulfonium bromide)
Tribenzyl sulfonium hydrogen sulfate In principle any quaternary phosphonium compound can be used as a catalyst. Those, however, which are soluble in water and/or in the organic solvent in which the polycondensation takes place are preferably used. Certain quaternary phosphonium compounds which from the experiments appeared to give particularly good results are e.g.:

Triphenylmethyl phosphonium iodide
Triphenylbenzyl phosphonium chloride
p-Xylylene-bis(triphenyl phosphonium chloride)
p-Xylylene-bis(triethyl phosphonium bromide)
Tetraethyl phosphonium bromide
Triethyloctadecyl phosphonium iodide
Phenylethylpentamethylene phosphonium acetate
Bis(triethyl phosphonium acetate)-1,4-butane and many others e.g. those mentioned by Kosolapoff in "Organophosphorous Compounds" (John Wiley and Sons, New York, 1950), p. 86–94.

Suitable quaternary arsonium compounds are given by A. Michaelis, Ann. Chem. 321, 141–248 (1902), and of F. F. Blicke among others in J. Am. Chem. Soc., 60, 421 (1938), 61, 89 (1939), and 63, 1493 (1941), e.g., Triphenylmethyl arsonium iodide
Triphenylmethyl arsonium hydroxide
Triphenylethyl arsonium iodide
Triphenylhydroxyethyl arsonium chloride In the preparation of polythiocarbonates according to the invention, alkali bisphenates of bisphenols according to the above formula can also be replaced up to 50% by an alkali salt of another aromatic dihydroxy compound.

The following compounds appeared from experiments to give good results:

4,4'-dihydroxydiphenyl
2,2'-dihydroxydiphenyl
3,3'-dihydroxydiphenyl
Dihydroxynaphthalenes such as 2,6-dihydroxynaphthalene
Hydroquinone
Resorcinol
2,6-dihydroxytoluene
2,6-dihydroxychlorobenzene
3,6-dihydroxytoluene, etc.

It is evident that copolymers can also be prepared when starting the polycondensation with mixtures of thiophosgene and acid chlorides of dibasic acids, among others with Phosgene
Terephthalyl chloride
Iso-phthalyl chloride
Sebacyl chloride
Adipyl chloride
Diacid chloride of bis(4-carboxyphenyl)-ether
Bischloroformate-2,2-bis(4-hydroxyphenyl)-propane
Bischloroformate of ethyleneglycol, etc.

The polythiocarbonates or the copolyester which contain thiocarbonate units in the polymer chain, dependent upon the chemical structure of the applied bisphenols are soluble in one or more chlorinated aliphatic hydrocarbons such as methylene chloride, chloroform, dichloroethane, 1,2,2 - trichloroethane, methyl chloroform, sym.-tetrachloroethane and trichloro ethylene. Some of the polyesters according to the invention are moreover soluble in aromatic hydrocarbons such as benzene, toluene, xylene, etc. or in cyclic ethers such as tetrahydrofurane and dioxane.

Due to the fact that the polyethiocarbonates according to the invention are thermoplastic, they can be worked up from the melt into useful shaped articles by means of the known manufacturing techniques such as molding, injection molding and vacuum forming.

Solutions of the polythiocarbonates in methylene chloride, in 1,2-dichloroethane or in sym.-tetrachloroethane according to the invention can be used for casting colorless transparent films with good mechanical properties. By stretching the obtained films, the mechanical properties can still be markedly improved.

The dimensional stability of the film is very high when exposed to changing circumstances of temperature and humidity. This property makes them especially suitable for the manufacture of dimensionally stable photographic film supports.

The following examples illustrate the invention without, limiting, however, the scope thereof.

*Example 1*

6.84 g. of 2,2'-bis(4-hydroxyphenyl)-propane, 61 cm.$^3$ of a 1 N aqueous sodium hydroxide, 0.25 g. of triethylbenzyl ammonium chloride and 20 cm.$^3$ of methylene chloride are brought successively in a three-necked flask of 250 cm.$^3$, fitted with a stirrer and a dropping funnel. While stirring at 20° C., a solution of 3.45 g. of thiophosgene in 20 cm.$^3$ of methylene chloride is added dropwise in 60 minutes.

After the adding of the thiophosgene solution, the reaction mixture is stirred for still 2 h. at room temperature whereby the polymer precipitates as a viscous mass. The supernatant aqueous layer is decanted and the residue is washed two times under strong stirring with 100 cm.$^3$ of water. By pouring the polymer solution into boiling water and after drying the formed precipitate at 100° C., a polymer is separated. The intrinsic viscosity, measured at 25° C. in sym.-tetrachloroethane, amounts to 1.10 dl./g.

A film cast from a methylene chloride solution has a softening point of 145–150° C., a modulus of elasticity of 225 kg./sq. mm., a yield point of 7 kg./sq. mm., a tensile strength of 6.6 kg./sq. mm. and an elongation at break of 20%.

The polymer has the following recurring unit:

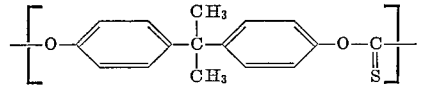

*Example 2*

9.12 g. of 2,2'-bis(4-hydroxyphenyl)-propane, 80.0 cm.$^3$ of 1 N aqueous sodium hydroxide, 200 mg. of triphenylbenzyl phosphonium chloride and 25 cm.$^3$ of methylene chloride are successively brought in a three-necked flask of 250 cm.$^3$, fitted with a stirrer and a dropping funnel. With stirring at 20° C. a solution of 2.3 g. of thiophosgene and 4.06 g. of isophthaloyl chloride in 25 cm.$^3$ of methylene chloride is dropwise added in 30 minutes. After adding the thiophosgene solution, the reaction mixture is stirred for still 2 h. at room temperature whereby the polymer precipitates as a viscous mass. The supernatant aqueous layer is decanted and the residue is washed two times under strong stirring with 50 cm.$^3$ of water. By pouring the polymer solution into boiling water the polymer precipitates which is separated and dried at 100° C.

The intrinsic viscosity, measured at 25° C. in sym.-tetrachloroethane amounts to 0.96 dl./g.

The polymer has the following recurring unit:

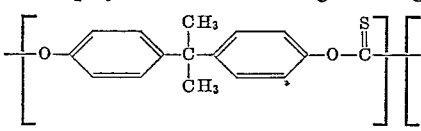 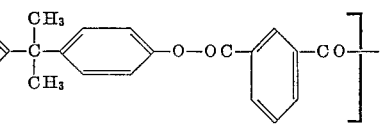

We claim:
1. A process for preparing a high molecular weight linear thermoplastic polyester of an acid component consisting essentially of thiophosgene and a polyhydric alcohol consisting essentially of at least one bisphenolic compound of the formula

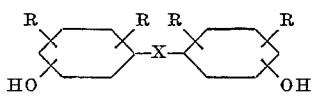

where each R is selected from the group consisting of hydrogen, alkyl, and a halogen atom and where X is selected from the group consisting of

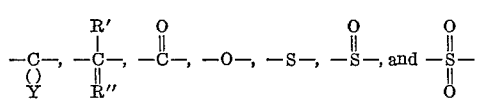

representing the atoms necessary to close a lower cycloaliphatic ring and R' and R" each representing a member of the group consisting of hydrogen, alkyl, haloalkyl, a phenyl radical, and a cycloalkyl radical, alkyl in all instances being lower alkyl and halo- and halogen in all instances being a halogen atom of atomic weight less than 100, which process comprises the steps of condensing such acid component in solution in an organic liquid which is immiscible with water and a solvent for the ultimate polyester, with the alkali metal alcoholate of such polyhydric alcohol dissolved in water, and recovering the resultant polyester from said organic liquid.

2. The process of claim 1 wherein said polyhydric alcohol includes a second aromatic dihydric compound of the formula HO—R—OH wherein R is a member of the group consisting of a phenylene radical, a diphenylene radical, and a naphthalene radical, said second dihydric compound being present in an amount up to an equal molar proportion with such bis-phenolic compound.

3. The process of claim 1 in which the condensation is carried out in the presence of a catalytic amount of an onium compound selected from the group consisting of a quaternary ammonium compound, a tertiary sulfonium compound, a quaternary phosphonium compound and a quaternary arsonium compound.

References Cited by the Examiner
UNITED STATES PATENTS

| | | | |
|---|---|---|---|
| 2,901,501 | 8/1959 | Wasson | 260—455 |
| 2,964,797 | 12/1960 | Peilstocker | 260—47 X |
| 3,030,331 | 4/1962 | Goldberg | 260—47 X |
| 3,046,255 | 7/1962 | Strain | 260—77.5 |

OTHER REFERENCES

Gevaert (Belgium) 597, 208, May 18, 1961, abstract available in Derwent Belgium Patents Report, vol. 1, No. 78A, page C3, August 1961.

Kabaivanov et al.: Chem. Abs., vol. 56, page 5869e (1962), abstract from Godishnik Khim Teknol. Ins., vol. 6, No. 1, pages 37–43 (1959).

WILLIAM H. SHORT, *Primary Examiner.*

LOUISE P. QUAST, *Examiner.*